(12) United States Patent
Shaik et al.

(10) Patent No.: US 7,426,655 B2
(45) Date of Patent: Sep. 16, 2008

(54) SYSTEM AND METHOD OF ENHANCING STORAGE ARRAY READ PERFORMANCE USING A SPARE STORAGE ARRAY

(75) Inventors: Sadiq A. Shaik, Bangalore (IN); Ahmad H. Tawil, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 524 days.

(21) Appl. No.: 11/012,802

(22) Filed: Dec. 13, 2004

(65) Prior Publication Data

US 2006/0143503 A1 Jun. 29, 2006

(51) Int. Cl.
*G06F 11/00* (2006.01)
(52) U.S. Cl. .......................................... 714/6; 711/114
(58) Field of Classification Search ........................ None
See application file for complete search history.

(56) References Cited

U.S. PATENT DOCUMENTS

| | | | | |
|---|---|---|---|---|
| 6,112,257 A * | 8/2000 | Mason et al. | ................. | 710/18 |
| 6,334,195 B1 | 12/2001 | DeKoning et al. | ............. | 714/7 |
| 6,442,650 B1 * | 8/2002 | Bachmat et al. | ............. | 711/114 |
| 6,487,634 B1 * | 11/2002 | Bachmat | ..................... | 711/112 |
| 6,625,747 B1 | 9/2003 | Tawil et al. | .................... | 714/6 |
| 6,728,832 B2 * | 4/2004 | Yamamoto et al. | .......... | 711/114 |
| 6,886,074 B1 * | 4/2005 | Narayanaswamy et al. | . | 711/114 |
| 6,922,752 B2 * | 7/2005 | Uysal et al. | ................. | 711/114 |
| 7,003,642 B2 | 2/2006 | Dawkins et al. | ............. | 711/164 |
| 7,228,381 B2 * | 6/2007 | Uysal et al. | ................. | 711/114 |
| 7,254,674 B2 * | 8/2007 | Yamamoto et al. | .......... | 711/114 |
| 7,356,728 B2 | 4/2008 | Tawil et al. | .................... | 714/5 |
| 2004/0049643 A1 * | 3/2004 | Alavarez et al. | ............ | 711/162 |

* cited by examiner

*Primary Examiner*—Christopher McCarthy
(74) *Attorney, Agent, or Firm*—Baker Botts L.L.P.

(57) ABSTRACT

A system and method for enhancing read performance of at least one storage array using a spare storage array of coupled spare drives, wherein the at least one storage array includes coupled drives configured to store data according to a redundant storage methodology. Data is copied from at least one logical disk of data from the at least one storage array onto the spare storage array and read from the least busy array of the at least one storage array or the spare storage array.

18 Claims, 6 Drawing Sheets

SYSTEM AND METHOD OF ENHANCING STORAGE ARRAY READ PERFORMANCE USING A SPARE STORAGE ARRAY

TECHNICAL FIELD

The present disclosure relates generally to the field of storage systems and networks, and, more particularly, to a system and method for enhancing storage array read performance using a spare storage system.

BACKGROUND

As the value and use of information continues to increase, individuals and businesses seek additional ways to process and store information. One option available to users of information is an information handling system. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a storage system or storage network that includes some measure of fault tolerant data storage. One example of a fault tolerant data storage system is a RAID (Redundant Array of Inexpensive Disks) storage system. RAID storage systems combine multiple disks into an array of disk drives to obtain performance, capacity, and reliability advantages over other storage techniques, including, for example, a single large drive. RAID Level 5 is an example of a fault tolerant data storage system. A RAID Level 5 storage system is characterized by the striping of data across disks in the storage system. A set of parity bits generated by an exclusive-OR of the data bits is stored on a disk that is separate from the striped data. The parity bits for the respective stripes of data are distributed in the disks of the storage system so that each disk will likely contain both data bits for a stripe of data and parity bits related to some other stripe of data. In a RAID Level 5 storage system, it is typical that no single disk includes all of the parity bits. RAID Level 5 is often referred to as "rotating parity" storage.

Although the parity bits in RAID storage systems provide some measure of fault tolerance, many RAID storage systems include the ability to attach spare disk drives that can be used as automatic replacement disk drives if a disk drive in the RAID storage system fails. These spare disk drives, often referred to as "hot spare" drives, further reduce the risk of irretrievable data loss due to disk drive failure. While hot spare drives are advantageous for data integrity, hot spare drives are wasted resources during normal operation of the RAID storage system: until a disk drive in the RAID storage system fails, a hot spare drive will remain idle. Some storage systems have tried to take advantage of the idle storage space by using the hot spare drives as log devices. When a disk drive in the RAID storage system fails, the hot spare is converted from a log device to substitute storage. However, if the data saved in the storage system are redundant, as in a RAID Level 5 storage system, a log device is not useful. Other storage systems avoid using hot spare drives and instead reserve spare storage space within the RAID storage system for performance enhancement and failure protection. These storage systems restrict the use of the spare storage space to the disk drives in the particular RAID storage system in which it is included, rather than making the spare storage space available to any disk drive that may benefit.

SUMMARY

In accordance with the present disclosure, we provide a system and method for enhancing read performance of at least one storage array using a spare storage array. The at least one storage array includes coupled drives configured to store data according to a redundant storage methodology. A logical disk of data from the at least one storage array is copied to the spare storage array. The data may be read from either the at least one storage array or spare storage array, such that the data is read from the least busy storage array.

The system and method disclosed herein is technically advantageous, particularly for static data, because it enhances read performance without additional cost or sacrifice of storage space. The second storage array continues to provide the same amount of data protection as it would when the system and method are not employed. The system and method offer the additional technical advantage of permitting the second storage array to be available to any data storage array in an information handling system, including multiple arrays. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, mouse, and a video display. The information handling system may also include one or more buses operable to transmit communications between the various hardware components.

Figure 1:
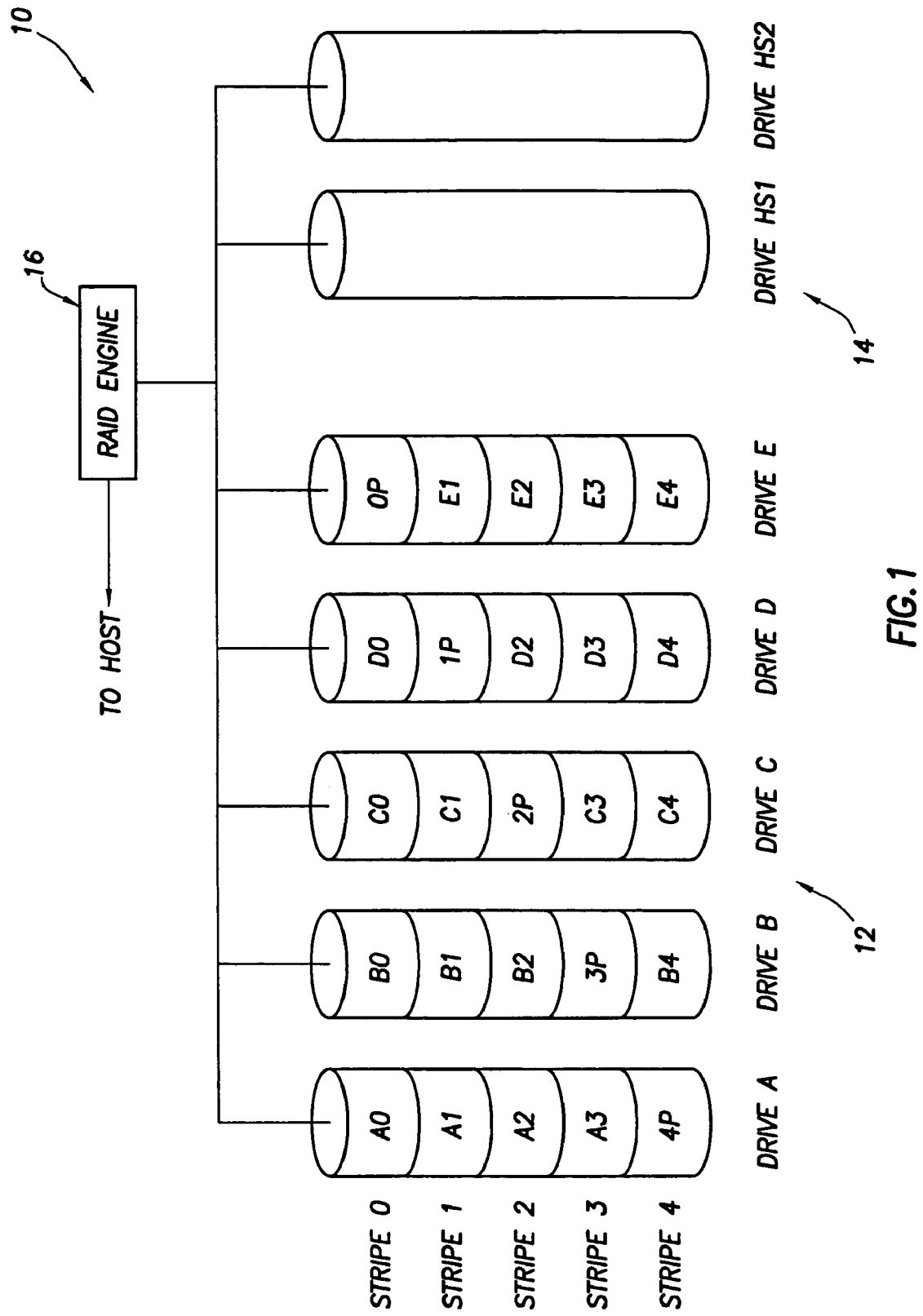
FIG. 1 is a diagram of the physical drives and data stripes of a RAID Level 5 storage array with additional hot spare physical drives.

FIG. 1 shows a diagram of a storage array, indicated generally at 10, that includes five user physical drives or disks, labeled "Drive A" through "Drive E." The user physical drives include one or more individual hard drives (not shown). The user physical drives define a user storage array 12. Storage array 10 also includes a spare storage array 14. Spare storage array 14 includes two hot spare physical drives, Drive HS1 and Drive HS2. In FIG. 1, spare storage array 14 is dedicated to user storage array 12. Alternatively, spare storage array 14 may be a global spare storage array assigned to multiple user storage arrays. Both user storage array 12 and spare storage array 14 couple to a RAID engine 16 and other components (not shown) of an information handling system, such as one or more host servers.

User storage array 12 is configured as a RAID Level 5 storage system, with five stripes or rows of data, labeled "Stripe 0" through "Stripe 4." The configuration of the user storage array shown in FIG. 1 is simply an illustration of an example user storage array. A user storage array may have more or fewer disks or physical drives, each with more or fewer stripes. Moreover, the user storage array may use a different RAID level, such as RAID Level 1, or may be configured using an alternative redundant storage methodology.

User storage array 12 contains one or more "logical disks." Each logical disk shown in FIG. 1 includes one stripe. A person of ordinary skill in the art having the benefit of this disclosure, however, will recognize that a logical disk may comprise one or more stripes. The stripes or rows may be of any size or width; the techniques described herein are not dependent on a particular stripe size. The data in each stripe or logical disk are distributed across the physical drives of user storage array 12. For example, data in Stripe 0 are stored in Drive A, Drive B, Drive C, and Drive D. The data blocks are labeled by drive and stripe, i.e., data blocks A0 and 1. Drive E contains the parity bits for Stripe 0 in a data block 0P. The parity bits are the result of an exclusive-OR operation performed on the content of Stripe 0 found in Drives A, B, C, and D. Likewise, the parity bits for Stripe 1, which are the result of an exclusive-OR operation performed on the content of Stripe 1 found in Drives A, B, C, and E, are stored in data block 1P of Drive D. If, for example, Drive B were to fail or otherwise be degraded, the data in each stripe of Drive B would be rebuilt from the data in Drives A, C, D, and E.

During the time that a physical drive of user storage array 12 is offline for repair or replacement, RAID engine 16 may logically substitute a hot spare physical drive, such as either Drive HS1 or Drive HS2, for the offline physical drive. During normal operation of user storage array 12, however, Drive HS1 and Drive HS2 will typically be inactive. These idle storage resources may be used to improve the read performance of one or more logical disks or stripes of user storage array 12. That is, hot spare storage array 14 may be configured to store a mirror set of one or more logical disks from user storage array 12. As discussed in greater detail later in this application, RAID Engine 16 may then read the data from the least busy storage array. This selective reading process enhances the read performance of the selected logical disk(s).

Figure 2:
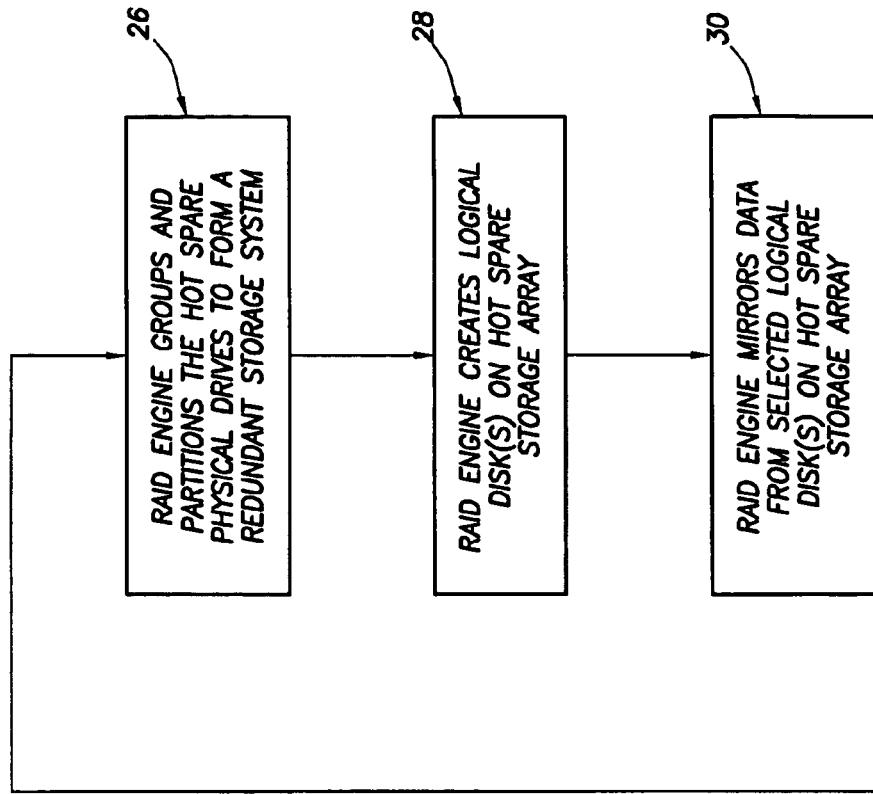
FIG. 2 is a flow diagram of a method for creating a mirror set of data for one or more user logical drives on one or more hot spare physical drives.
Figure 2:
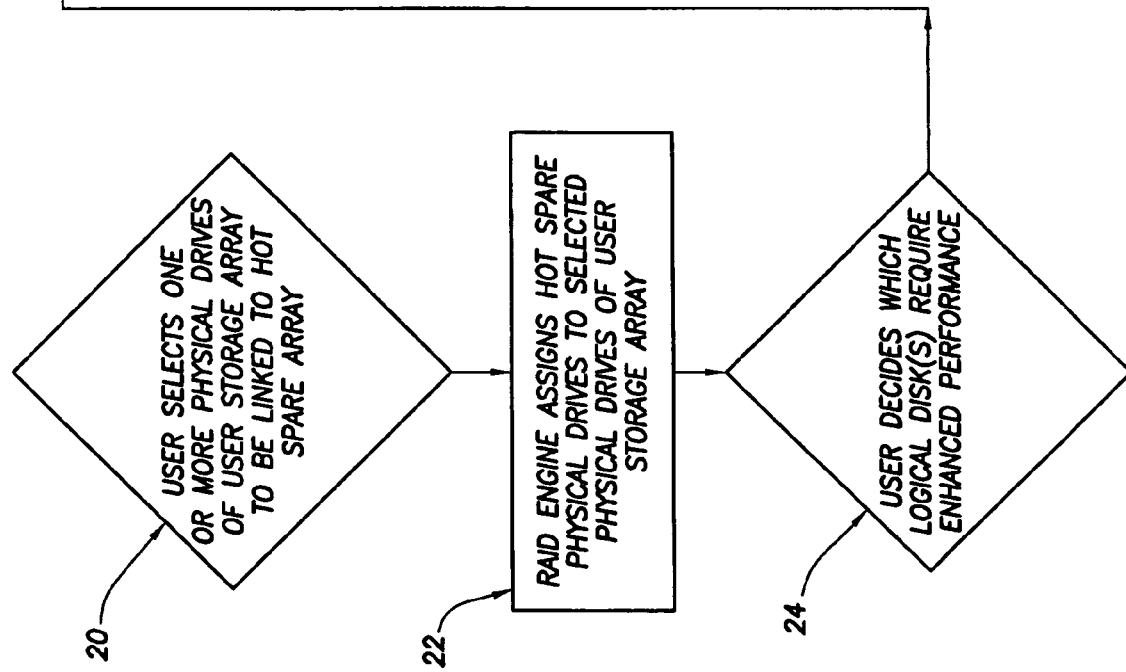

The flow chart in FIG. 2 shows the steps needed to prepare the mirror set of data on the hot spare array. In block 20, the user selects one or more physical drives of the user storage array to be linked to the hot spare array. The user will base her decision on the level of data protection she wants for a particular physical drive, as well as the performance required for the logical disks on the physical drive: the hot spare storage array should be assigned to those physical drives for which the user needs the greatest data protection and/or enhanced performance. If desired, the user may select the physical drives at the same time the user storage array is created. The user may choose to dedicate hot spare storage array 14 to user storage array 12 as a whole or globally to multiple user storage arrays, as desired. RAID Engine 16 then assigns hot spare physical drives from the hot spare storage array to the user-selected logical disks of the user storage array, as shown in block 22.

In block 24, the user decides which logical disks from the selected physical drives of the user storage array will be copied on hot spare storage array 14. The user may select for mirroring one or more logical disks for which she desires enhanced performance. RAID Engine 16 may then group and partition the physical drives in hot spare storage array 14 to create a RAID set, as shown in block 26. RAID Engine 16 may configure hot spare storage array 14 in any RAID level, or in an alternative storage methodology, depending on the performance and redundancy the user requires. Because of its superior read and write performance, RAID Level 0 may be a particularly advantageous configuration for hot spare storage array 14, especially if user storage array 12 is already configured as a redundant storage system. However, if the user desires additional data protection, she might configure the hot spare storage array as a RAID Level 5 system. The RAID configuration can be user-selectable when the hot spare storage array is assigned to physical drives of the user storage array or during creation of user storage array 12. The RAID configuration of spare storage array 14, however, is independent of the RAID configuration of user storage array 12. Once hot spare storage array 14 is configured, RAID Engine 16 will then create one or more logical disks on hot spare storage array 14, as shown in block 28. The logical disks on hot spare storage array 14 should have the same capacity as the one or more logical disks from the user storage array the user selected for mirroring. RAID Engine 16 will finally create a mirror set of data from the selected logical disk(s) in the logical disks on hot spare storage array 14, as shown in block 30.

Figure 3:
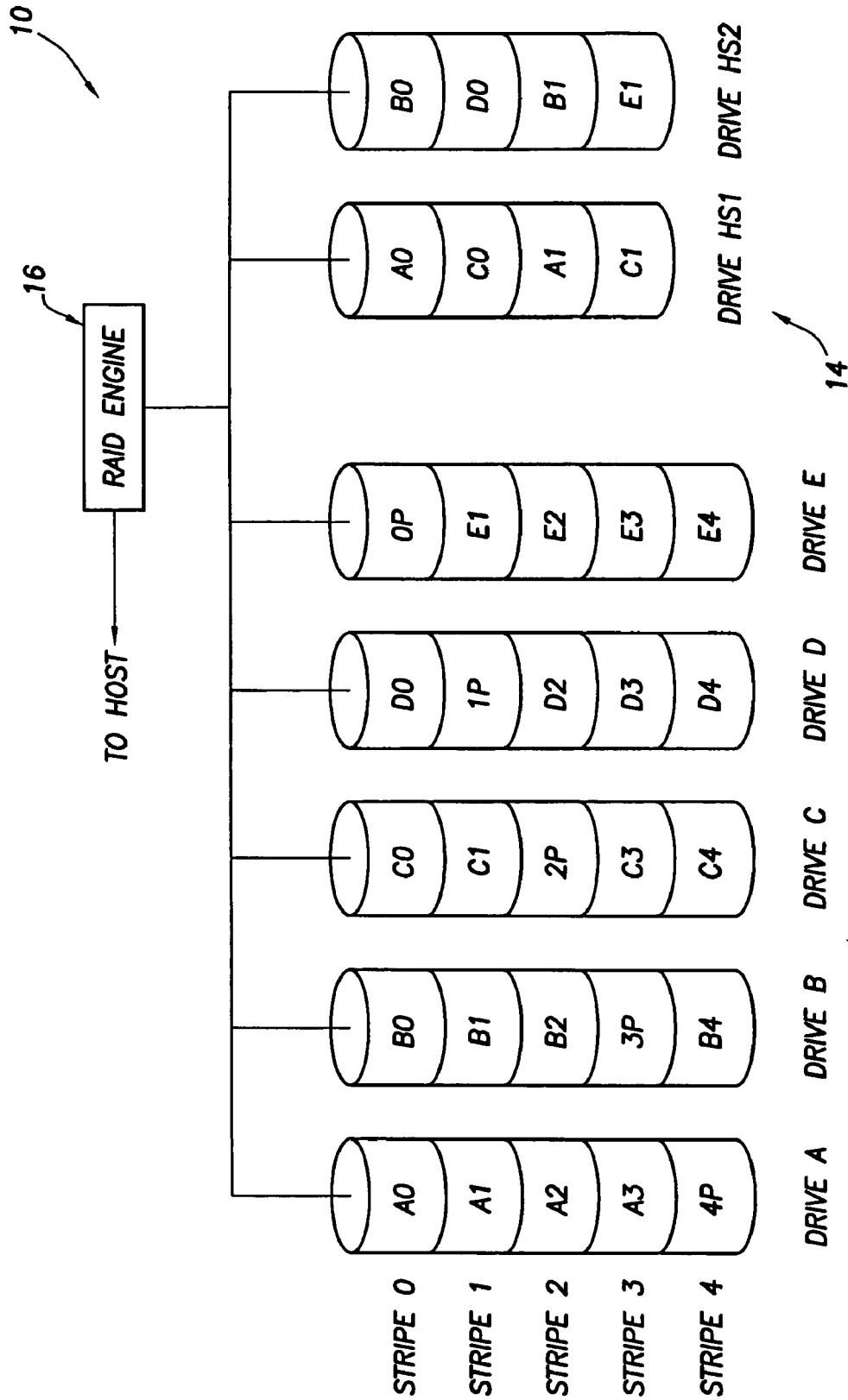
FIG. 3 is a diagram of the physical drives and data stripes of a RAID Level 5 storage array with mirror sets of data for two user logical drives on two hot spare physical drives.

FIG. 3 shows the end result of the process shown in FIG. 2. In this illustration, the user has chosen logical disks 0 and 1 from user storage array 12 for mirroring in hot spare storage array 14. Drive HS1 and Drive HS2 accordingly store data from both logical disks 0 and 1 in a RAID Level 0 configuration. In this example, Drive HS1 contains data from logical disk 0 mirrored from Drive A, Drive C, and Drive E, and data from logical disk 1 mirrored from Drive B and Drive D. Drive HS2 contains data from logical disk 0 mirrored from Drive B and Drive D, and data from logical disk 1 mirrored from Drive A, Drive C, and Drive E. The resulting storage array may be designated as "RAID Level 10 Enhanced," or "RAID Level 10E." Again, FIG. 3 depicts each logical disk as comprising only one stripe, but a person of ordinary skill in the art having the benefit of this disclosure will recognize that logical disks may comprise one or more stripes.

Figure 4:
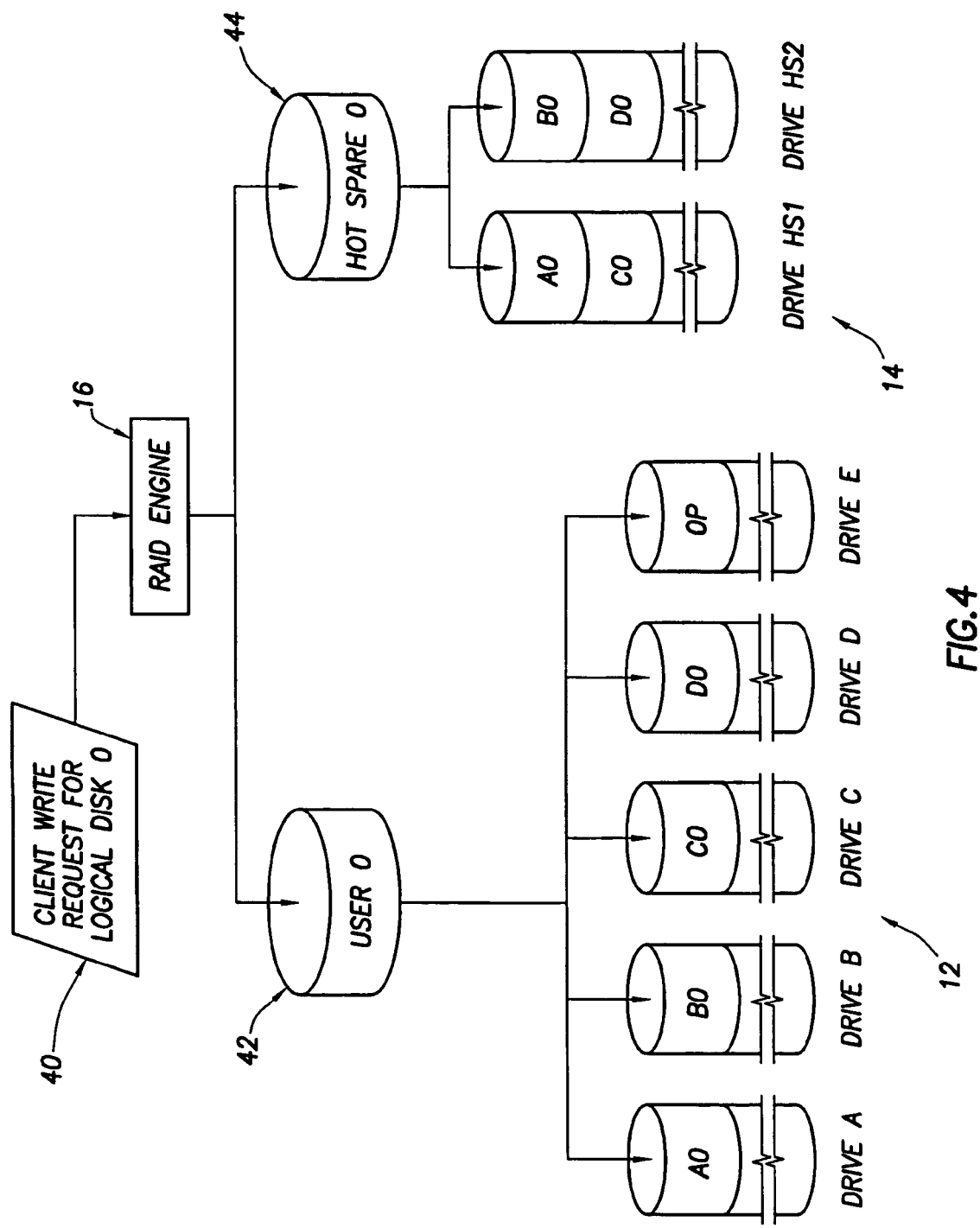
FIG. 4 is a diagram of a storage array processing a write request from a client system.

To ensure that the data on hot spare storage array 14 remains an accurate copy of the data on the selected logical disk from the user storage array, each time RAID Engine 16 receives a client write request, RAID Engine 16 must write the data to both the logical disk on user storage array 12 and the corresponding logical disk on hot spare storage array 14. FIG. 4 is a block diagram of an example writing process for storage array 10. In block 40, the client sends a write request for logical disk 0 to RAID Engine 16. RAID Engine 16 then writes the data from the client to logical disk 0 on user storage array 12, labeled at 42, by writing to Stripe 0 across Drives A, B, C, D, and E. RAID Engine 16 also writes to the corresponding logical disk 0 on hot spare storage array 14, labeled at 44, by writing to Drives HS1 and HS2. Because RAID Engine 16 must write any new data in two places, the system and method disclosed herein may be most appropriate for static data that does not require frequent alteration.

Figure 5:
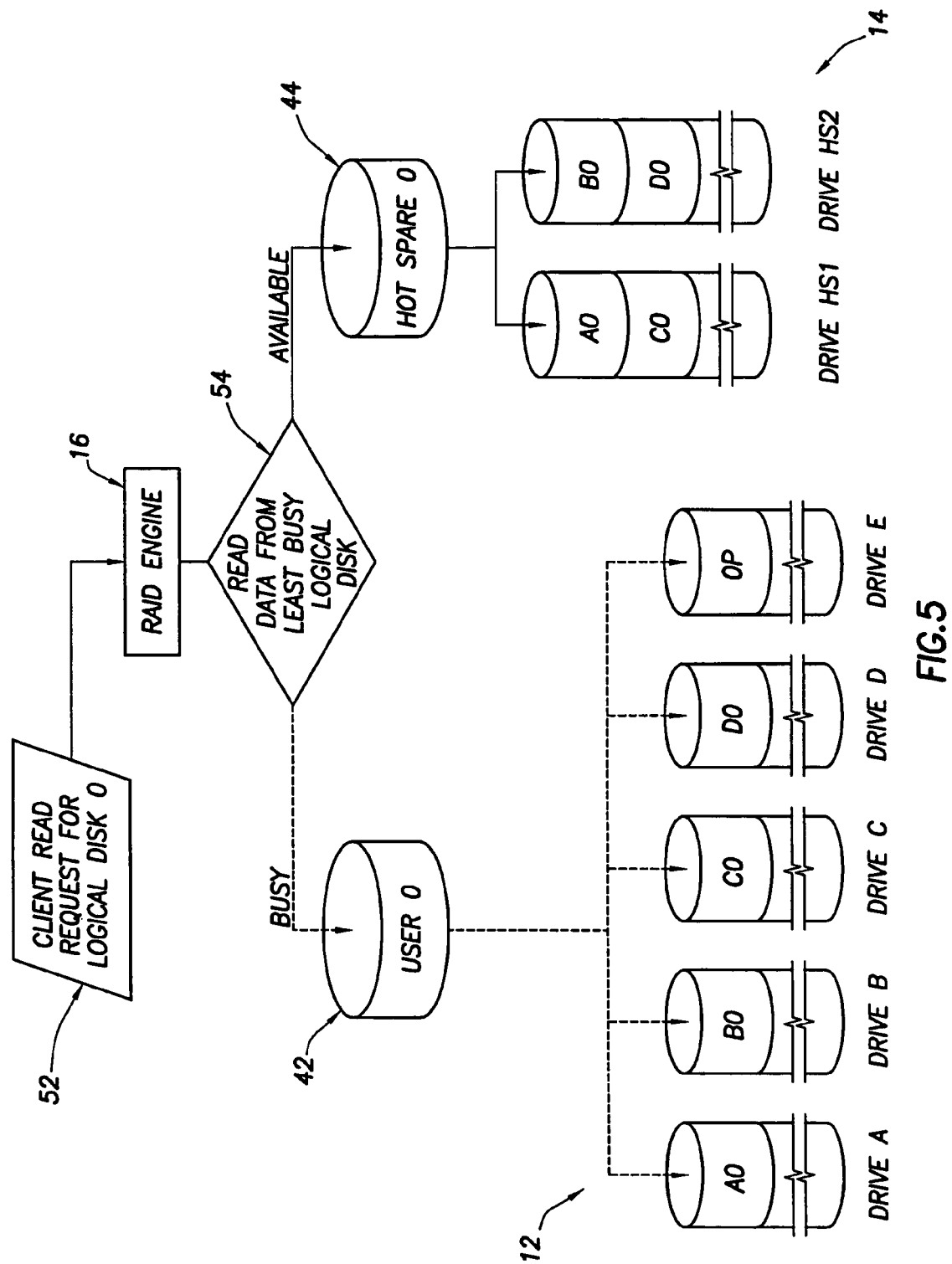
FIG. 5 is a diagram of a storage array processing a read request from a client system.

While user storage array 12 is functioning normally, RAID Engine 16 may access the data contained in Stripe 0 in either of two ways: through the logical disk 0 contained in user storage array 12, labeled as 42, or through the corresponding logical disk 0 on hot spare storage array 14, labeled as 44. FIG. 5 illustrates an example read process. At block 52, a client machine sends a read request to RAID Engine 16. At block 54, RAID Engine 16 must make a decision between processing the read request through user storage array 12 or through hot spare storage array 14. At the point in time shown in FIG. 5, user storage array 12 is busier than hot spare storage array 14 when RAID Engine 16 processes the read request. RAID Engine 16 thus chooses to read the data from hot spare storage array 14 instead or user storage array 12. Likewise, if hot spare storage array 14 is busier than user storage array 12, RAID Engine 16 may choose to process the read request through user storage array 12. RAID Engine 16 may use any of a number of measurements to determine the load of the physical drives, including, but not limited to, the number of outstanding commands, the latency time to complete the I/O, and/or the number of bytes remaining to transfer.

RAID Engine 16 may thus improve read performance for storage array 10 as a whole by selectively reading from the storage array that is least busy at the time of the read request. The enhancement in read performance is based on the number of hot spare physical drives available in storage array 10. For example, if hot spare storage array 14 includes one physical drive and the user storage array is configured as a RAID Level 1 array of a simple copy, the read performance would improve by 50%.

Figure 6:
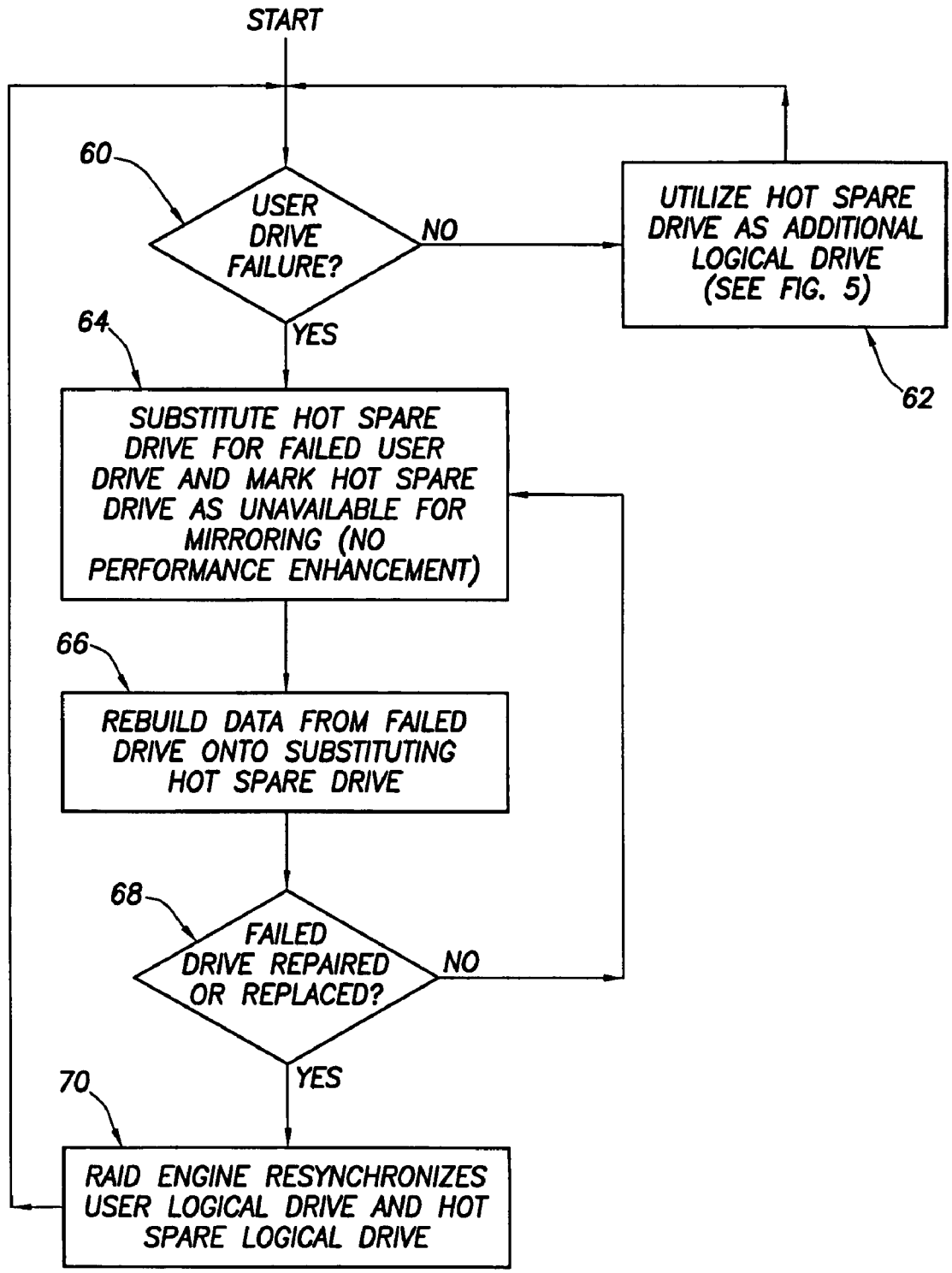
FIG. 6 is a flow diagram of method steps for managing use of a hot spare storage array.

If any of the physical drives of user storage array 12 fails, RAID Engine 16 may reconfigure one of the physical drives of hot spare storage array 14 to act as a temporary substitute for the failed drive. During the repair, Drive HS1 will be marked as not available for mirroring by RAID Engine 16. The flowchart in FIG. 6 illustrates a process RAID Engine 16 may use to manage the use of hot spare storage array 14. In block 60, RAID Engine 16 determines whether any physical drives of user storage array 12 have failed. If all the physical drives of user storage array 12 are functioning properly, RAID Engine 16 may use hot spare storage array to enhance performance using the process shown in FIG. 5, as indicated in block 62. If a physical drive in user storage array 12 has failed, RAID Engine 16 will substitute a hot spare drive for the failed drive and mark the hot spare drive as unavailable for mirroring, as shown in block 64. For example, if Drive A failed, RAID Engine 16 may substitute Drive HS1 for Drive A while Drive A is repaired or replaced. A physical drive may be identified as having "failed" if, for example, it experiences a mechanical failure of a hard drive or a temporary loss of power. Before Disk HS1 can be used as a substitute drive, however, RAID Engine 16 must mirror the data from Drive A on Drive HS1, as shown in block 66. RAID Engine 16 can recreate any data that Drive A contains that is not already on Drive HS1 from another source, such as Drive HS2 or Drives B, C, D, and E. RAID Engine 16 will then monitor whether the failed drive has been repaired or replaced, as shown in block 68; until then, the substituted hot spare drive will remain unavailable for performance enhancement. Once all user drives are back online, hot spare storage array 14 will be idle. RAID Engine 16 may then use hot spare storage array 14 to enhance the performance of the selected logical drives from user storage array 12. RAID Engine 16 must first resynchronize hot spare storage array 14 with the selected logical drives from user storage array 12, as shown at block 70. For example, RAID Engine 16 must ensure that the data in Stripe 0 is accurately mirrored in hot spare storage array 14 again. Once RAID Engine 16 completes the copying process, hot spare storage array 14 may be used to enhance performance again through the process shown in FIG. 5, as indicated in block 64.

A hot spare storage array may be dedicated to more than one user storage array, such that data from different user storage arrays may be mirrored on a single hot spare storage array. Likewise, hot spare storage arrays may be configured in RAID levels other than the Level 0 configuration shown in the figures of this disclosure. Although the present disclosure has been described in detail, various changes, substitutions, and alterations can be made hereto without departing from the spirit and scope of the invention as defined by the appended claims.

What is claimed is:

1. A method for enhancing read performance of at least one storage array using a spare storage array of coupled spare drives, wherein the at least one storage array includes coupled drives configured to store data according to a redundant storage methodology, comprising the steps of:
   copying at least one logical disk of data from the at least one storage array onto the spare storage array;
   determining which storage array from either the at least one storage array or the spare storage array is the least busy storage array, wherein the step of determining which storage array is the least busy storage array includes measuring a number of bytes remaining to transfer from each storage array; and
   reading the data from the least busy storage array.

2. The method for enhancing read performance of the at least one storage array of claim 1, further comprising the step of selecting at least one drive from the at least one storage array to be linked to the spare storage array.

3. The method for enhancing read performance of the at least one storage array of claim 1, further comprising the step of selecting a logical disk comprising at least one stripe of data from the at least one storage array for enhanced performance.

4. The method for enhancing read performance of the at least one storage array of claim 1, further comprising the step of configuring the spare drives to store data according to a redundant storage methodology.

5. The method for enhancing read performance of the at least one storage array of claim 4, wherein the step of configuring the spare drives to store data according to a redundant storage methodology includes the step of partitioning the spare drives to create a logical disk having the same capacity as the at least one logical disk to be copied from the at least one storage array.

6. The method for enhancing read performance of the at least one storage array of claim 1, wherein the step of determining which storage array is the least busy storage array includes measuring a number of outstanding commands for each storage array.

7. The method for enhancing read performance of the at least one storage array of claim 1, wherein the step of determining which storage array is the least busy storage array includes measuring latency time to complete input to and output from each storage array.

8. A storage array, comprising:
at least one set of storage drives coupled together as at least one storage array that is configured to store data according to a redundant storage methodology;
a set of spare storage drives coupled together as a spare storage array, wherein the set of spare storage drives contains a copy of a logical disk of data that is also stored in the at least one set of storage drives;
wherein, during normal operation of the at least one set of storage drives, data from the logical disk can be read from either the at least one storage array or spare storage array, such that the data are read from the least busy storage array; and
wherein the least busy storage array is determined by at least measuring a number of bytes remaining to transfer from each storage array.

9. The storage array of claim 8, wherein the at least one set of storage drives is coupled together as at least one storage array that is configured as a RAID Level 5 storage array.

10. The storage array of claim 8, wherein the set of spare storage drives is coupled together as a spare storage array that is configured to store data according to a redundant storage methodology.

11. The storage array of claim 8, wherein the set of spare storage drives is coupled together as a spare storage array that is configured as a RAID Level 0 storage array.

12. The storage array of claim 8, wherein the set of spare storage drives is coupled together as a spare storage array that is configured as a RAID Level 5 storage array.

13. The storage array of claim 8, further comprising a RAID Engine that can manage read requests and responses to read requests.

14. The storage array of claim 13, wherein the RAID Engine can determine which of the at least one storage array and spare storage array is the least busy storage array.

15. The storage array of claim 13, wherein the RAID Engine can manage write requests.

16. A method for enhancing read performance of at least one storage array using a spare storage array of coupled spare drives after the at least one storage array has experienced failure of a drive, wherein the at least one storage array is configured to store data according to a redundant storage methodology, comprising the steps of:
substituting a spare drive for the failed drive in the at least one storage array;
monitoring the at least one storage array to determine when the failed drive returns to service;
copying at least one logical disk of data from the at least one storage array to the spare storage array once the failed drive has returned to service;
determining which storage array from either the at least one storage array or the spare storage array is the least busy storage array, wherein the step of determining which storage array is the least busy storage array includes measuring a number of bytes remaining to transfer from each storage array; and
reading the data from the least busy storage array.

17. The method for enhancing read performance of the at least one storage array of claim 16, further comprising the step of configuring the spare storage array to store data according to a redundant storage methodology once the failed drive has returned to service.

18. The method for enhancing read performance of the at least one storage array of claim 16, further comprising the step of determining which storage array is the least busy storage array.

* * * * *